(12) United States Patent
Wright et al.

(10) Patent No.: US 9,916,769 B2
(45) Date of Patent: Mar. 13, 2018

(54) IDENTIFICATION METHOD FOR TRAINING VEHICLE ACCESSORY

(71) Applicant: Gentex Corporation, Zeeland, MI (US)

(72) Inventors: Thomas S. Wright, Holland, MI (US); Bradley R. Hamlin, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 243 days.

(21) Appl. No.: 14/692,063

(22) Filed: Apr. 21, 2015

(65) Prior Publication Data

US 2015/0310765 A1    Oct. 29, 2015

Related U.S. Application Data

(60) Provisional application No. 61/983,822, filed on Apr. 24, 2014.

(51) Int. Cl.
*G09B 9/04* (2006.01)
*G09B 19/16* (2006.01)

(52) U.S. Cl.
CPC ................... *G09B 19/167* (2013.01)

(58) Field of Classification Search
CPC .......... G09B 19/167; B60R 2001/1215; B60R 2325/205; B60R 25/102; B60K 2350/108; G06Q 50/30; H04N 7/185; G06K 9/78
See application file for complete search history.

(56) References Cited

U.S. PATENT DOCUMENTS

| 5,475,366 A | 12/1995 | Van Lente et al. |
| 8,620,772 B2 | 12/2013 | Owen |
| 8,855,423 B2 * | 10/2014 | Boncyk ............. G06F 17/30259 382/181 |

(Continued)

FOREIGN PATENT DOCUMENTS

| JP | 4536300 B2 | 9/2010 |
| WO | 2004043726 A1 | 5/2004 |

OTHER PUBLICATIONS

International Search Report and Written Opinion of the International Searching Authority, or the Declaration dated Nov. 10, 2016 for International Application No. PCT/US2015/027076 filed Apr. 22, 2015; 8 pages.

*Primary Examiner* — Robert J Utama
*Assistant Examiner* — Jerry-Daryl Fletcher
(74) *Attorney, Agent, or Firm* — Price Heneveld LLP; Bradley D. Johnson (57) ABSTRACT

A method for identifying a vehicle accessory with a mobile device is disclosed. The method comprises receiving an input in the mobile device and activating an identification function in a control circuit of the mobile device in response to the input. An image viewfinder is initiated in response to the activation of the identification function. The viewfinder is used to capture an image of the vehicle accessory including at least one feature. The at least one feature in the image is compared to a plurality of corresponding features of a plurality of compatible vehicle accessories. Based on the comparison, an identity of the vehicle accessory is identified. Training information for the vehicle accessory is then accessed and displayed on the mobile device to facilitate at least one setup task of the vehicle accessory in response to identifying the vehicle accessory.

18 Claims, 5 Drawing Sheets

(56) References Cited

U.S. PATENT DOCUMENTS

| | | |
|---|---|---|
| 2009/0096937 A1 | 4/2009 | Bauer et al. |
| 2011/0093190 A1 | 4/2011 | Yoon |
| 2013/0063243 A1 | 3/2013 | Witkowski et al. |
| 2013/0090785 A1 | 4/2013 | Baratono et al. |

* cited by examiner

IDENTIFICATION METHOD FOR TRAINING VEHICLE ACCESSORY

CROSS-REFERENCE TO RELATED APPLICATION

This application claims priority to and the benefit under 35 U.S.C. §119(e) of U.S. Provisional Patent Application No. 61/983,822, filed Apr. 24, 2014, entitled IDENTIFICATION METHOD FOR TRAINING VEHICLE ACCESSORY, the entire contents of which is hereby incorporated by reference in its entirety.

TECHNOLOGICAL FIELD

The present disclosure relates generally to a method for identifying a vehicle accessory and more particularly relates to a method for identifying a vehicle accessory having a trainable control system.

SUMMARY

One aspect of the present disclosure includes a method for identifying a vehicle accessory with a mobile device. The method comprises receiving an input in the mobile device and activating an identification function in a control circuit of the mobile device in response to the input. An image viewfinder is initiated in response to the activation of the identification function. The viewfinder is used to capture an image of the vehicle accessory including at least one feature. The at least one feature in the image is compared to a plurality of corresponding features of a plurality of compatible vehicle accessories. Based on the comparison, an identity of the vehicle accessory is identified. Training information for the vehicle accessory is then accessed and displayed on the mobile device to facilitate at least one setup task of the vehicle accessory in response to identifying the vehicle accessory.

Another aspect of the present disclosure includes a non-transitory machine-readable storage medium, having stored thereon a computer program having at least one code section configured to be implemented by a device. The device comprises a display, an image capture device, and at least one processor in communication with the display and the image capture device. The at least one code section executable by the processor to perform the steps to identify a vehicle accessory. A first step may include activating an identification routine in response to receiving an input. Image data is received from the image capture device depicting at least one feature of the vehicle accessory. The at least one feature is compared to a plurality of corresponding features of a plurality of vehicle accessories. Based on the comparison, the vehicle accessory is identified and information corresponding to at least one trainable operation of the vehicle accessory is accessed.

Yet another aspect of the present disclosure includes a system for identifying a vehicle accessory. The system comprises a display, an image capture device, and at least one processor in communication with the display and the image capture device. The at least one processor is operable to activate an identification routine in response to receiving an input and receive image data from the image capture device. The image data depicts at least one feature of the vehicle accessory. The processor compares the at least one feature to a plurality of corresponding features of a plurality of compatible vehicle accessories. Based on the comparison the vehicle accessory is identified. Based on the identification, the processor is operable to access information corresponding to at least one trainable operation of the vehicle accessory.

These and other features, advantages, and objects of the present device will be further understood and appreciated by those skilled in the art upon studying the following specification, claims, and appended drawings.

DETAILED DESCRIPTION OF EMBODIMENTS

Figure 1:
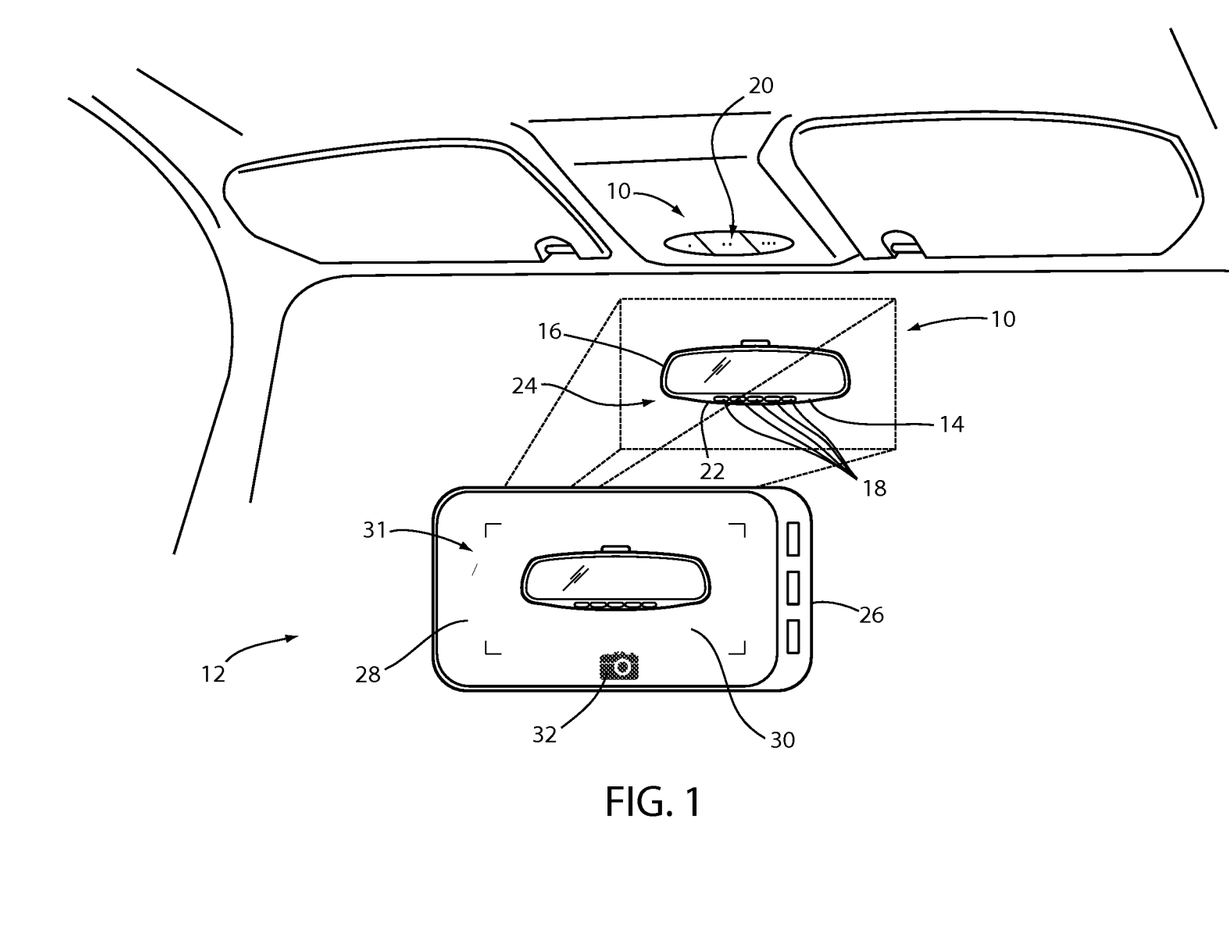
FIG. 1 is an environmental view of a mobile device implementing a method for identifying a vehicle accessory for training.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, an environmental view of a vehicle accessory 10 is shown in a passenger compartment 12 of a vehicle. In this example, the vehicle accessory corresponds to a rearview display device 14 including a bezel 16 and a plurality of features 18. The vehicle accessory may also correspond to a user interface 20 disposed in an overhead console or any other location in the vehicle, for example, a center console, an armrest of a door panel, etc. The plurality of features 18 may correspond to any visible features of the vehicle accessory. For example, the plurality of features may correspond to a plurality of programmable or pre-programmed user inputs, a light sensor, an interior camera, various control inputs for a rearview display, etc. In an exemplary implementation, at least one of the plurality of features 18 corresponds to a programmable user input 22 for a trainable control system 24.

The trainable control system 24 may correspond to a HOMELINK® trainable control system or any other trainable control system. The trainable control system 24 may utilize a receiver, transmitter, and/or transceiver to send and receive data corresponding to a variety of remote control devices. A remote control device may correspond to any device configured to control an electronic device. For example, a remote control device may include a garage door opener control, a remote home security control, a lighting controller, etc. In operation, the trainable control system 24 is operable to receive a control signal and program the signal to control an electronic device. For example, the trainable control system 24 may be configured to learn and re-transmit one or more control signals configured to open/close a moving barrier, turn on/off lighting, activate/deactivate a security system, etc.

Instructions for training a programmable user input may be complex and difficult to identify for a particular model and design of a trainable control system. For example, various features and/or bezels may be implemented having various orientations and layouts that may be difficult for an operator of a vehicle to distinguish in order to identify the particular model of the trainable control system installed in the vehicle. The appearance of each trainable control system may vary among vehicle manufacturers, geographic sales regions, particular models of vehicles, particular model years of the same model vehicle, and trim levels of vehicles. Additionally, training instructions may vary for each different type or manufacturer of the device being controlled. The numerous variations may confuse vehicle operators and limit a rate of utilization of such trainable control systems. As such, the complexity of these systems may result in limited interest from consumers.

The disclosure provides for methods and systems that may be implemented in a mobile device 26 to quickly and easily identify a particular trainable control system, for example the trainable control system 24. The methods and systems discussed herein may be implemented in many types of mobile devices, for example a camera, cellular phone, smart phone, tablet, laptop, etc. The methods introduced herein may comprise various steps configured to receive information in the form of user inputs and image data to identify a particular model of a trainable control system. This information may then be utilized to improve an ease of use of the trainable control system 24.

The mobile device 26 may utilize image data corresponding to the orientation and appearance of the plurality of features 18 and the bezel 16 to identify a model of the trainable control system 24. In response to identifying the model of the trainable control system 24 of the vehicle accessory 10, the method is configured to provide links and/or access various information corresponding to the identified trainable control system 24. Information corresponding to training materials, manufacturer advertisements, instructional videos, and any other material related to the trainable control system 24 may be accessed by or delivered to the mobile device 26 in response to identifying the trainable control system 24. In this way, the mobile device 26 may be utilized to quickly and easily identify the trainable control system 24 and provide information to a user in order to improve the ease and convenience of utilizing a trainable control system in any vehicle.

In some implementations, a camera system 28 of the mobile device 26 may be implemented to capture an image 30 and/or video of the vehicle accessory 10 and display the image 30 on a display 31 of the mobile device 26. The image 30 may be captured by the camera system 28 in response to a user input 32. In this example, the camera system 28 of the mobile device 26 is utilized to capture the image 30 of the rearview display device 14. In some implementations, image data corresponding to the image 30 may be processed by the mobile device 26 to identify the plurality of features 18. The image data may also be transmitted to a remote server via a wireless communication circuit or a local wireless interface of the mobile device 26. Additionally, the image data may be manually captured by a user of the mobile device and sent via email or multimedia message service (MMS) to transmit the image data corresponding to the rearview display device 14 to the remote server.

The image data may be processed locally on the mobile device 26 and/or may be processed remotely on the remote server to identify a particular model, manufacturer, and/or type of a trainable control system utilized in the vehicle accessory 10 as pictured in the image data. The image data may be compared to a database of features corresponding to various vehicle accessories 10 that include various trainable control systems that may be compatible with or identifiable by the mobile device 26. Based on the plurality of features 18, the particular model in this example may be identified as the rearview display device 14 including a particular trainable control system. Upon identification of the trainable control system 24, the mobile device 26 may request, access, and/or receive information related to the trainable control system 24 utilized in the rearview display device 14.

Referring now to FIGS. 2A-2D examples of vehicle accessories 10 are shown that may be identified by the methods and systems disclosed herein. Based on the identification of a particular vehicle accessory, a trainable control system may be identified to provide a user with information related to the trainable control system. The information may be accessed by the mobile device 26 to provide various information related to the trainable control system, for example training information, videos, features, offers for additional equipment, and/or software to enhance the system.

The vehicle accessories 10 may be identified by any features that are visually apparent in the image data corresponding to the image 30. The features illustrated in FIGS. 2A-2D demonstrate a variety of user inputs, hardware, and characteristics shapes. In some implementations, text and/or characters on a bezel, user input or any other feature may also be utilized to identify a particular vehicle accessory 10. In some cases, the image data may also be processed through various methods to enhance the image data and improve the recognition of the features 18 including the bezel 16. Though the examples discussed in reference to FIGS. 2A-2D refer to rearview displays, the disclosed systems and methods may be applied to identify any vehicle accessory 10 and a corresponding trainable control system.

Figure 2A:
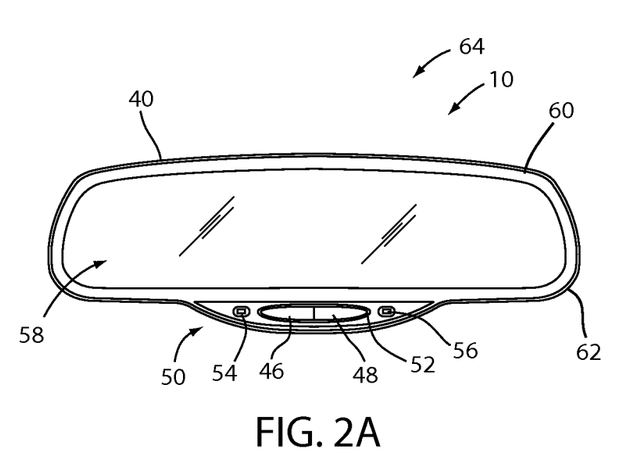
FIG. 2A is a front view demonstrating a vehicle accessory including a plurality of features to identify the accessory.

Referring to FIG. 2A, a first rearview display assembly 40 is shown. The first rearview display assembly 40 comprises a first user input 46 and a second user input 48 disposed in a lower portion 50 of the first rearview display assembly 40. The first user input 46 and the second user input 48 include a rounded exterior profile 52. A first light sensor 54 and a second light sensor 56 are further disposed in the lower portion 50 on either side of the user inputs 46-48. The first rearview display assembly 40 includes a mirror and/or display portion 58 and a bezel 60. The bezel 60 forms an exterior profile shape 62.

The elements described in reference to numerals 46-62 correspond to a plurality of identifying features 64 corresponding to the first rearview display assembly 40. Each of the features 64 is shown having a particular shape, orientation, and arrangement that may be identified by the portable device 26 or a remote server to identify the first rearview display assembly 40. Based on the identification of the first rearview display assembly 40, information related to a trainable control system corresponding to the first rearview display assembly 40 may be accessed by the portable device 26. The information related to the trainable control system identified in the first rearview display assembly 40 may provide useful training and information related to features of the trainable control system.

Figure 2B:
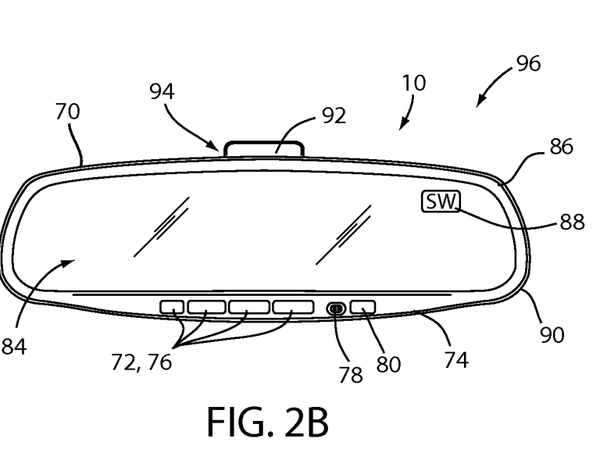
FIG. 2B is a front view demonstrating a vehicle accessory including a plurality of features to identify the accessory.

Referring to FIG. 2B, a second rearview display assembly 70 is shown. The second rearview display assembly 70 comprises a plurality of user inputs 72 disposed in a lower portion 74 of the second rearview display assembly 70. Each of the plurality of user inputs 72 has a rectangular exterior profile 76. A light sensor 78 and an interior camera 80 are also disposed in the lower portion 74 on one side of the plurality of user inputs 72. The portion of the interior camera 80 shown may correspond to an optic portion configured to capture light data that may impinge upon at least a portion of the second rearview display assembly.

The second rearview display assembly 70 includes a mirror and/or display portion 84 and a bezel 86. At least one of a time display, an environmental indication (e.g. temperature, humidity, etc.), and a directional indication or compass readout 88 may be disposed in the mirror and/or display portion 84. The bezel 86 forms an exterior profile shape 90. A mirror angle control button 92 is also connected to a top portion 94 of the second rearview display assembly 70. Similar to the first rearview display assembly 40, each of the elements described in reference to numerals 72-94 correspond to identifying features 96 of the second rearview display assembly 70. Each of the features 96 may be identified from image data captured by the portable device 26. The image data may be processed by the portable device 26 or a remote server to identify the second rearview display assembly 70 and a corresponding trainable control system.

Figure 2C:
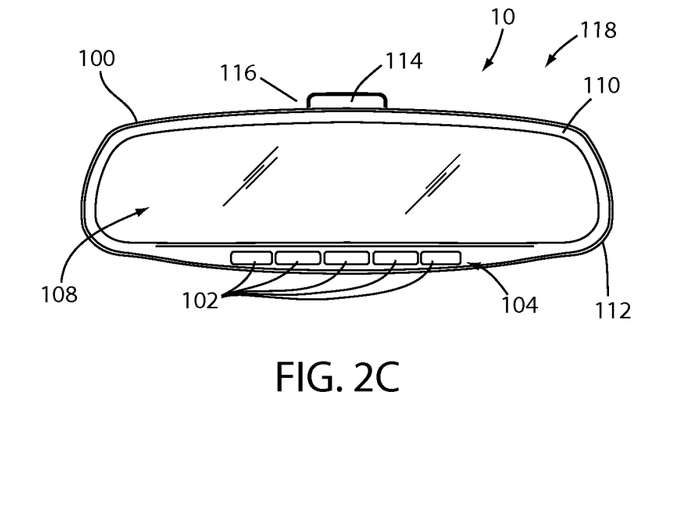
FIG. 2C is a front view demonstrating a vehicle accessory including a plurality of features to identify the accessory.

Referring to FIG. 2C, a third rearview display assembly 100 is shown. The third rearview display assembly 100 comprises a plurality of user inputs 102 or a user interface disposed in a lower portion 104 of the third rearview display assembly 100. Each of the plurality of user inputs has a rectangular exterior profile 106. The third rearview display assembly 100 includes a mirror and/or display portion 108 and a bezel 110. The bezel 110 forms an exterior profile shape 112. A mirror angle control button 114 is also connected to a top portion 116 of the third rearview display assembly 100. Similar to the first and second rearview display assemblies 40 and 70, each of the elements described in reference to numerals 102-116 correspond to identifying features 118 of the third rearview display assembly 100. Each of the features 118 may be identified from image data by the portable device 26 or a remote server to identify the third rearview display assembly 100 and a corresponding trainable control system.

Figure 2D:
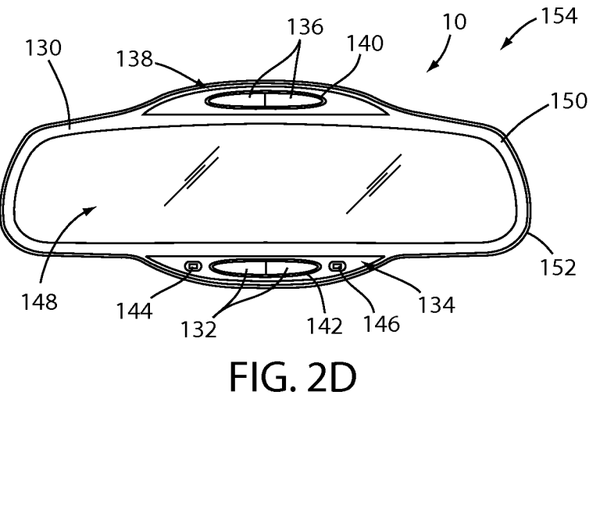
FIG. 2D is a front view demonstrating a vehicle accessory including a plurality of features to identify the accessory.

Referring to FIG. 2D, a fourth rearview display assembly 130 is shown. The fourth rearview display assembly 130 comprises a first plurality of user inputs 132 disposed in a lower portion 134 and a second plurality of user inputs 136 disposed in an upper portion 138. The first plurality of user inputs 132 has a first rounded exterior profile 140, and the second plurality of inputs 136 has a second rounded exterior profile 142. A first light sensor 144 and a second light sensor 146 are further disposed in the lower portion 134 on either side of the first plurality of inputs 132. The fourth rearview display assembly 130 includes a mirror and/or display portion 148 and a bezel 150. The bezel 150 forms an exterior profile shape 152. Similar to the rearview displays 40, 70, 100, each of the elements described in reference to numerals 132-152 correspond to identifying features 154 of the fourth rearview display assembly 130. Each of the features 154 may be identified from image data by the portable device 26 or a remote server to identify the fourth rearview display assembly 130 and a corresponding trainable control system.

Figure 3:
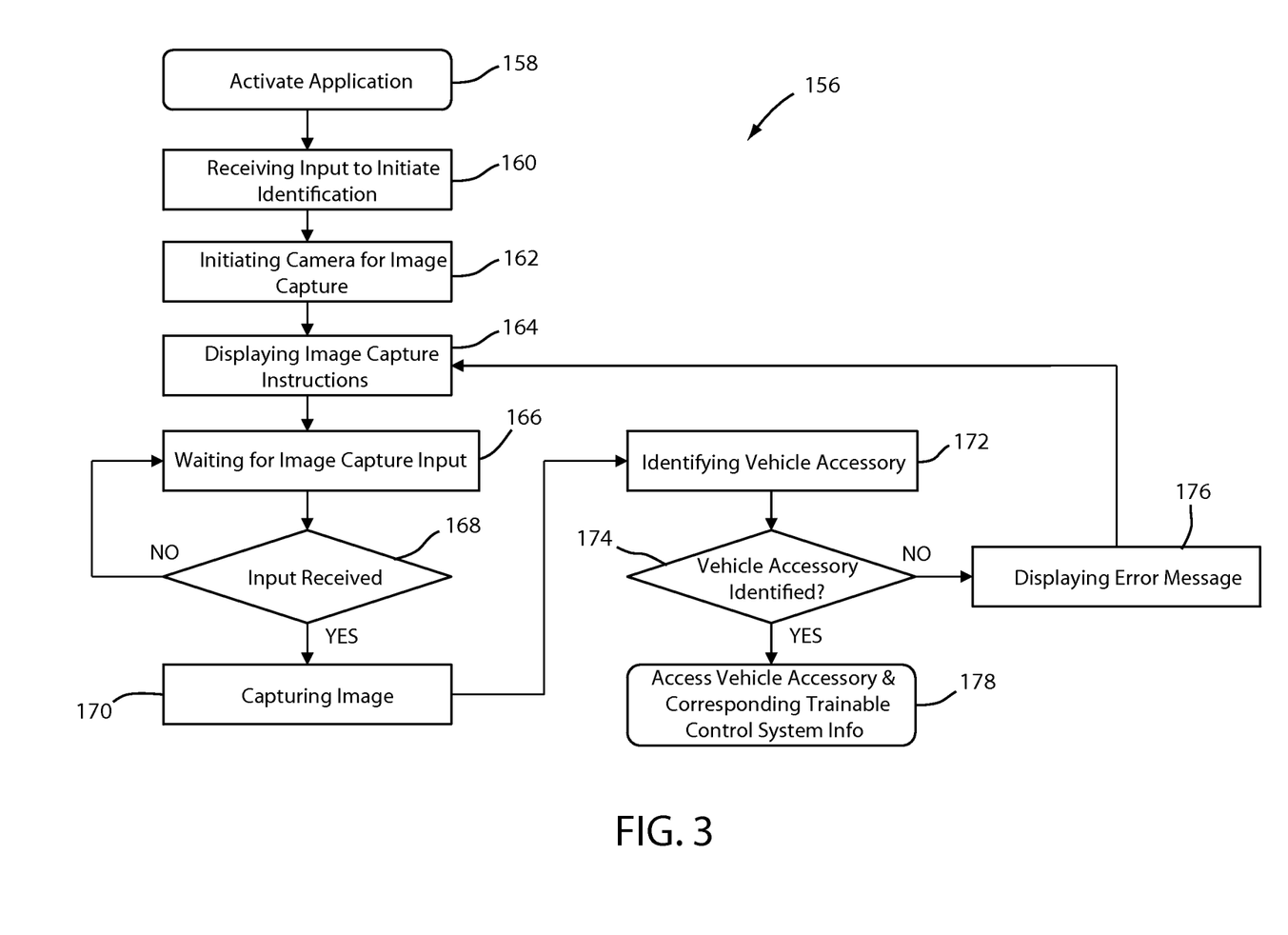
FIG. 3 is a flow chart demonstrating a method for identifying a vehicle accessory for training.

Referring now to FIG. 3, a flow chart of a method 156 for identifying a vehicle accessory 10 and a corresponding trainable control system is shown. The method may begin by activating an application on a mobile device 26 (158). The application may be activated by a user input in the form of a selection displayed on a user interface or display screen of the mobile device 26. Once the application is running on the mobile device 26, the mobile device 26 is configured to receive an input from a user to initiate an identification of the vehicle accessory 10 and a corresponding trainable control system (160). As discussed previously, the vehicle accessory 10 may be any device or interface that may require specific instructions for programming, for example the rearview display assemblies 14, 40, 70, 100, 130.

The identification process begins by initiating a camera system to capture an image of the vehicle accessory 10 (162). In order to facilitate the capture of an image of the vehicle accessory 10, instructions for the capture of the image may be displayed on the display 31 of the mobile device 26 (164). The method may wait for an image to be captured while a user is aiming and adjusting the field of view of the camera system of the mobile device 26 (166). The mobile device 26 is configured to monitor for an input to initiate the capture of the image (168). In response to the receipt of the input, the mobile device 26 may respond by capturing an image of the vehicle accessory 10 (170).

Once the image of the vehicle accessory 10 is captured, the mobile device 26 may compare the image data from the image of the vehicle accessory 10 with a database of vehicle accessories that are compatible with the system. In some implementations, the mobile device 26 may be configured to send the image data via a communication circuit, local wireless interface, or any other form of wireless communication to a remote server. Similar to the mobile device 26, the remote server may access a database of vehicle accessories that are compatible with a particular brand or type of trainable control system, for example HOMELINK® trainable control devices.

In various implementations, the mobile device 26 and the remote server may function similarly by processing image data to identify one or more features corresponding to a vehicle accessory, for example the features 64, to identify a particular vehicle accessory (e.g. the rearview display assembly 40). The plurality of features may be identified in the image data by various forms of image processing algorithms and feature detection methods. Some methods for feature detection that may be applied to detect the features of an image may include various edge, corner, and blob detection methods. Edge and corner detection methods may include Canny, Sobel, and Harris & Stephens/Plessey methods. Other detection methods may include Shi & Tomasi, Level curve curvature, Features from accelerated segment test (FAST), Laplacian of Gaussian, Difference of Gaussians, Determinant of Hessian, etc. Each of the feature detection methods described herein may be processed by a processor of the mobile device 26 and/or the remote server.

The results of the feature detection from the captured image may be compared to a database of vehicle accessories including various features of each vehicle accessory to identify the trainable control device. Based on the comparison of the detected features in the image data, and the database of vehicle accessories, the method may select one or more candidate vehicle accessories from the database to identify the specific vehicle accessory from the image data (172). The method may continue to determine if a specific vehicle accessory is identified from the database based on a confidence interval or percent of likelihood of the detected features matching those corresponding to a the particular device in the database (174).

If the specific vehicle accessory is not identified in the database at a predetermined confidence level or percentage match, an error message may be displayed on the mobile device 26 and the method may return to step 164 (176). If the specific vehicle accessory is identified in the database at a predetermined confidence level or percentage match, the method may continue to provide the mobile device 26 access to various information about the identified vehicle accessory and a corresponding trainable control system (170). With the specific vehicle accessory identified, the mobile device 26 and/or the remote server may be configured to provide a variety of training materials, links, and options corresponding to the trainable control system and display the options on the display of the mobile device 26 for selection by a user.

The information corresponding to the identified vehicle accessory and the trainable control system may be accessed by, delivered to, and/or requested by the mobile device in variety of ways. For example, the remote server may send links to the mobile device 26 that may be accessed by a user of the device by interacting with a user interface of the mobile device 26. The mobile device 26 may also access similar links or information from a local memory or request similar information from the remote server in response to identifying the vehicle accessory. The information may correspond to instructions or videos providing information to the user via a display and speaker of the device instructing the user how to program a trainable control system to learn and re-transmit at least one control signal of a remote control device configured to control an electronic device. As previously discussed, a remote control device may include a garage door opener control, a remote home security control, a lighting controller, etc.

In some implementations, the information for the identified vehicle accessory may include a video or instructions that describe step by step procedures for programming the trainable control system to program the trainable control system to function as a remote control device. For example referring now to FIG. 2A, if a user desired to teach a vehicle accessory, such as the rearview display assembly 40, to function as a garage door opener remote control, a video may be accessed by the mobile device 26 via a memory, communication circuit, or local wireless interface. The video may instruct a user of the trainable control system of the rear view display assembly 40 by providing a sequence and timing to interact with the first user input 46 and the second user input 48. The video may provide various instructions to the user of the mobile device 26 that are configured to program the trainable control system to emit signals corresponding to those output by the garage door opener remote control. Examples of trainable control systems, for example a HOMELINK® system and other similar systems are described in U.S. Pat. No. 9,819,498, entitled "SYSTEM AND METHOD FOR WIRELESS RE-PROGRAMMING OF MEMORY IN A COMMUNICATION SYSTEM," filed Aug. 21, 2012, by Chris H. Vuyst; and U.S. Pat. No. 8,384,513, entitled "TRANSMITTER AND METHOD FOR TRANSMITTING AN RF CONTROL SIGNAL," filed Jan. 3, 2006, by Todd R. Witkowski, which are included herein by reference in their entirety.

In response to the mobile device 26 accessing the information from the remote server, the remote server may record usage statistics related to the types of devices that are being identified by using the method 156 and similar methods discussed herein. The usage statistics may be utilized to identify particular types of vehicle accessories identified by the method 156 to determine which customers that have utilized the method 156 and corresponding vehicle brands, models, and geographic information. This information may be valuable to a manufacturer in determining a target audience for a vehicle accessory including a trainable control system as discussed herein.

In some implementations, a mobile device may have limited capabilities. In such cases, methods similar to the method 156 may be utilized to identify a vehicle accessory. Devices with limited capabilities may include camera phones, cameras, and other devices that may have a limited capability to operate applications or software that is not included in an original operating system for such devices (e.g. phones and cameras not categorized as smart devices). To accommodate such devices and as an option for any mobile device with at least a camera system, a user may capture a picture comprising image data corresponding to a vehicle accessory 10. The image data may be sent to a remote server via email over the internet or through a communication circuit of the mobile device, as an attachment to an MMS message, or any other digital communication method.

Upon receipt of the image data, a remote server may identify the vehicle accessory 10 and a corresponding trainable control system similar to step 168 of the method 156. The remote server may respond to a successful identification of the vehicle accessory by sending links of information for the vehicle accessory and training information corresponding trainable control system of the vehicle accessory. The information related to the vehicle accessory may be sent to the mobile device by similar methods to those utilized to send the image data to the remote server. In this way, the systems and methods discussed herein provide for broad applicability of utilizing the methods disclosed herein for identifying the vehicle accessory 10 and providing training information for a corresponding trainable control system.

In some implementations, the mobile device may also be operable to identify a remote control device for programming a trainable control system utilized in the vehicle accessory. For example, some trainable control systems require information identifying a manufacturer of a remote control device (e.g. a garage door opener remote control). In such cases, the mobile device may be operable to additionally capture image data and determine a particular model or manufacturer of the remote control device. Similar to the identification of the vehicle accessory 10, the mobile device 26 may instruct a user to capture image data of the remote control device to be programmed. The mobile device may also be operable to identify a remote control device by scanning a QR code, barcode, UPC, model number, or any other visible information that may be visible on the remote control device, a controlled device (e.g. a garage door opener), or any manufacturer packaging thereof.

The additional information captured in image data by the mobile device 26 may be utilized by the mobile device 26 or a remote server to identify the remote control device to be programmed to the trainable control system. Identifying the remote control device, coded information, or any other identifying information corresponding to the remote control device may be identified by similar steps to those described in the method 156. For example, the image data may be processed and compared to a database of remote control devices by the mobile device and/or the remote server to determine the manufacturer and model of the remote control device. The information identified for the remote control device may be utilized to improve the information and instructions provided on the user interface or display of the mobile device to improve programming instructions for a trainable control system for the identified remote control device.

Figure 4:
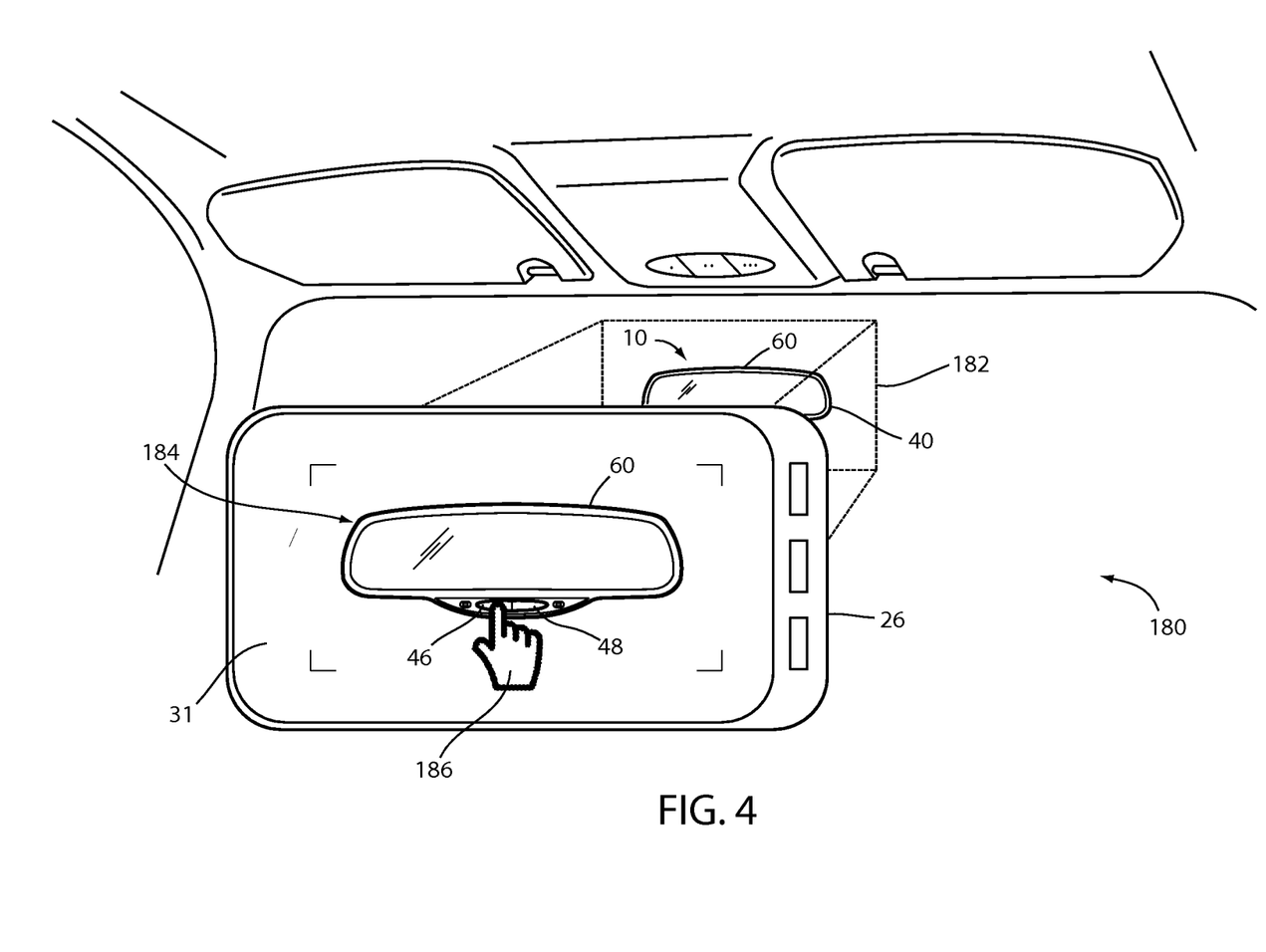
FIG. 4 is an environmental view of a mobile device implementing an augmented reality program for training a vehicle accessory.

Referring now to FIG. 4, an exemplary environment 180 demonstrating a method of training a trainable control system of a vehicle accessory 10 is shown. Once the vehicle accessory is identified by the method 156, the mobile device 26 may access a variety of training information and videos to demonstrate steps required to program the trainable system. In some implementations, the mobile device may receive instructions in the form of an augmented reality program demonstrated on the display 31 of the mobile device 26. The augmented reality program may be accessed by the device from memory and/or a remote server via the communication circuit or the local wireless interface.

The augmented reality program may function in combination with various systems of the mobile device 26 or similar devices. A detailed description of the mobile device 26 is described in reference to FIG. 5. The augmented reality program may be configured to combine images received from the camera system with rendered or virtual graphics. For example, the mobile device 26 may be oriented such that the rearview display assembly 40 is inside a field of view 182 of the camera system as shown in FIG. 4.

Image data from the camera system is processed by a processor of the mobile device 26 in order to detect the orientation of the rearview display assembly 40 in the field of view 182. The orientation of the rearview display assembly 40 may be identified by the processor of the mobile device 26 by detecting features, for example the bezel 60, the first user input 46, and the second user input 48. The features of the rearview display device 14 may be determined by comparing the detected features with features corresponding to the rearview display assembly 40 in image data stored in the memory of the mobile device 26 similar to the feature detection previously described. The image data 184 corresponding to the rearview display assembly 40 is also shown on the display 31.

Once the orientation and location of at least one of the bezel 60, the first user input 46, and the second user input 48 are determined, the processor of the device may overlay a graphic, symbol, animation, or video over the image data 184 of the rearview display assembly shown on the display 31. A pointer 186 is shown overlaid on the image data 184 to give a virtual demonstration of programming the trainable control system of the rearview display assembly 40. The pointer 186 may be configured to move to various positions in the image data 184 corresponding to the identifying features 64 of the rearview display assembly 40. Additionally, the augmented reality program may provide audio instructions which correspond to various programming steps corresponding to the location of the pointer 186. As discussed herein, the location and orientation of various features, for example the bezel 60, the first user input 46, and the second user input 48, may be referred to as one or more targets. The one or more targets may be identified by one or more augmented reality modules of the processor to identify a location of a graphic, a symbol, an animation, or a video overlaid on the image data 184.

For example, the pointer 186 is initially positioned over the first user input 46. The augmented reality program may provide an audible instruction controlled by the processor of the mobile device in conjunction with a particular step of a programming sequence required to program the trainable control system of the rearview display assembly 40. The audible instruction may be output by the mobile device by the processor through a speaker. The audible instruction may include a voice instruction, for example, "hold down the first user input for 5 seconds." Each of the steps in the programming sequence may be similarly displayed on the display 31 and announced from the speaker as controlled through a predetermined timing in the augmented reality program and processed by the processor. In this way, the trainable control system of the rearview display assembly 40 may easily be programmed by a user by following the audible instructions and virtual display instructions demonstrated by the pointer 186.

The processor of the mobile device 26 may further be operable to function interactively with a trainable control system of a vehicle accessory 10. Continuing the previous example, a user may hold down the first input 46 of the rearview display assembly 40 for 5 seconds, in response to the audible instruction from the mobile device 26. In response to the user holding down the first input, the trainable control system of the rearview display may communicate a signal to the mobile device 26. The signal may be communicated as an audible tone or a visible signal, for example a flashing light on the rearview display assembly 40. The mobile device 26 may be operable to detect the signal via a microphone or the camera system in order to verify that the audible instruction has been completed by the user. In this way, the mobile device 26 may receive information, instructions, and feedback from the trainable control system of the rearview display assembly 40.

The augmented reality program, operated by the processor of the mobile device 26, may provide for an interactive training system for the trainable control system of the rearview display assembly 40. The augmented reality program may be similarly implemented to train other systems, for example the user interface 20 and the rearview display assemblies 70, 100, 130. In response to receiving the signal confirming that the audible instruction has been completed by the user, the processor of the mobile device 26 may continue to a later or additional instruction in the programming sequence required to program the trainable control system of the rearview display assembly 40. By implementing an augmented reality program to program a trainable control system, the systems and methods discussed herein provide improvements to aid users to successfully utilize a variety of trainable control systems and vehicle accessories.

Figure 5:
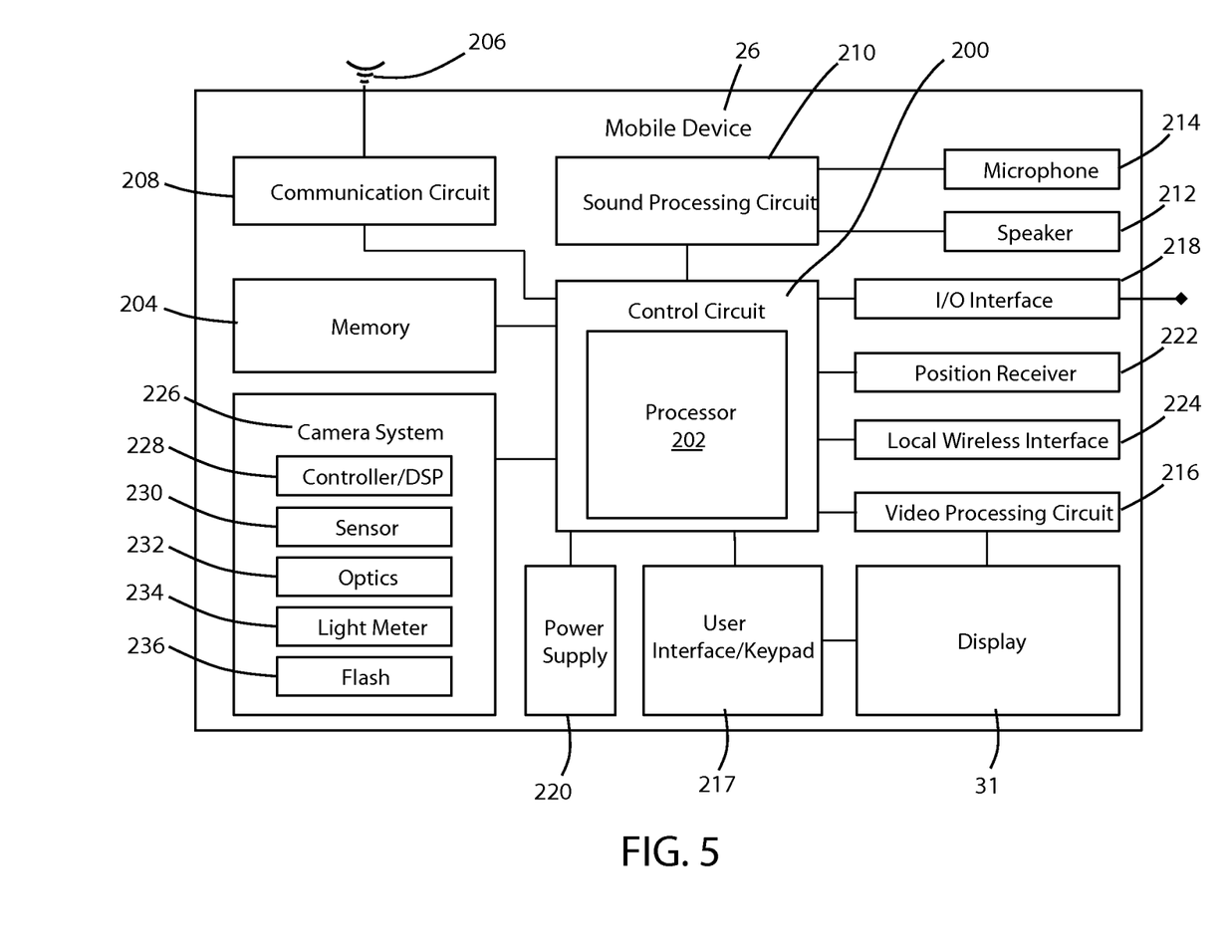
FIG. 5 is a block diagram of a system configured to implement a method for identifying a vehicle accessory for training in accordance with the disclosure.

FIG. 5 represents a functional block diagram of the mobile device 26. The mobile device 26 includes a primary control circuit 200 that is configured to control the functions and operations of the mobile device 26. The control circuit 200 may include a processor 202, such as a CPU, microcontroller or microprocessor. The processor 202 executes code stored in a memory (not shown) within the control circuit 200 and/or in a separate memory, such as the memory 204, in order to carry out various operations of the mobile device 26. The memory 204 may be, for example, one or more of a buffer, a flash memory, a hard drive, a removable media, a volatile memory, a non-volatile memory or other suitable devices.

The mobile device 26 may also include an antenna 206 coupled to a wireless communication circuit 208. The communication circuit 208 includes a radio frequency transmitter and receiver for transmitting and receiving signals via the antenna 206. The radio signals may be configured to transmit data and may correspond to various communications protocols. The communication circuit 208 may be configured to operate in a mobile communications system and may be used to send and receive data and/or audiovisual content.

Receiver types for interaction with a mobile radio network and/or wireless broadcast network may include GSM, CDMA, WCDMA, GPRS, MBMS, WiFi, WiMax, DVB-H, ISDB-T, etc., as well as advanced versions of these standards that may be developed at a later time.

The mobile device 26 may further include a sound signal processing circuit 210 for processing audio signals transmitted by and received from the communication circuit 208. Coupled to the sound processing circuit 210 are a speaker 212 and a microphone 214 that enable a user to listen and speak via the mobile device 26. The communication circuit 208 and sound processing circuit 210 are each coupled to the control circuit 200 so as to carry out overall operation of the mobile device 26. Audio data may be passed from the control circuit 200 to the sound signal processing circuit 210 for playback to the user. The audio data may include, for example, audio data from an audio file stored in the memory 204 and retrieved by the control circuit 200, or received audio data such as in the form of audio data from a remote server. The sound processing circuit 210 may include any appropriate buffers, decoders, amplifiers, etc.

The display 31 may be coupled to the control circuit 200 by a video processing circuit 216 that converts video data to a video signal used to drive the display 31. The video processing circuit 216 may include any appropriate buffers, decoders, video data processors, etc. The video data may be generated by the control circuit 200, retrieved from a video file that is stored in the memory 204, derived from an incoming video data stream received by the communication circuit 208 from the remote server or obtained by any other suitable method. The mobile device 26 may further comprise a user interface 217 or keypad in communication with the control circuit 200. The user interface may further function in connection with the display 31 to provide for a touch screen user interface configuration.

The mobile device 26 may further include one or more I/O interfaces 218. The IO interfaces 218 may be in the form of typical mobile telephone I/O interfaces and may include one or more electrical connectors. As is typical, the I/O interfaces 218 may be used to couple the mobile device 26 to a battery charger to charge a battery of a power supply 220 within the mobile device 26. Further, the I/O interfaces 218 may serve to connect the mobile device 26 to a personal computer or other device via a data cable for the exchange of data. The data exchanged may include image data for identifying a vehicle accessory. The mobile device 26 may receive operating power via the I/O interfaces 218 when connected to a power adapter.

The control circuit 200 may comprise one or more timers for carrying out timing functions. The mobile device 26 also may include a position data receiver 222, such as a global positioning system (GPS) receiver. The mobile device 26 also may include a local wireless interface 224, such as an infrared transceiver and/or an RF adapter or transceiver (e.g., a Bluetooth adapter or transceiver), for establishing communication with an accessory (for example the vehicle accessory 10), a computer or another device. For example, the local wireless interface 224 may operably couple the mobile device 26 to a vehicle accessory having a trainable control device with a compatible RF transceiver.

For example, the mobile device 26 may be operable to communicate programming information for the trainable control device to the vehicle accessory based on the identification of the vehicle accessory. For example, the mobile device 26 may identify or receive model information identifying a remotely controlled device (e.g. a garage door opener) and transmit information corresponding to control frequencies and codes of the remotely controlled device to the vehicle accessory 10 via the local wireless interface 224 in communication with the compatible RF transceiver. In this configuration, the mobile device 26 may be configured to communicate training information to the vehicle accessory such that the vehicle accessory may receive and store information to control the remotely controlled device.

The mobile device 26 may further be coupled to a camera system 226 including a controller 228, such as a digital signal processor (DSP). The functions of the controller 228 may be controlled by the control circuit 200. The camera system 226 may further include a sensor 230 (e.g., a charged-coupled device or CCD) to image a field of view as determined by imaging optics 232 of the camera system 226. A light meter 234 may detect illumination conditions in the field of view and a flash 236 may provide supplemental illumination during the capture of image data.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read-only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures that may be separately stored and managed, may be incorporated into a single memory or database, may be logically and physically organized in many different ways, and also may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method for identifying a programmable vehicle accessory with a mobile device, the method comprising:
 receiving an input in the mobile device;
 activating an identification function in a control circuit of the mobile device in response to the input;
 initiating an image viewfinder on a display of the mobile device in response to the activation of the identification function;
 capturing an image comprising image data of the programmable vehicle accessory with a camera system including at least one feature;
 identifying the at least one feature in the image data by processing the image data with a processor in communication with the camera system and comparing the image data to a plurality of corresponding features of a plurality of compatible vehicle accessories;
 identifying the programmable vehicle accessory based on comparing the at least one feature;
 accessing and displaying training information for the programmable vehicle accessory on the mobile device in response to identifying the programmable vehicle accessory; and
 actuating the programmable vehicle accessory based on the training information displayed on the mobile device.

2. The method according to claim 1, wherein the at least one feature comprises at least one feature of a mirror bezel.

3. The method according to claim 2, wherein the mirror bezel corresponds to a mirror having a user interface with at least one configurable function.

4. The method according to claim 3, wherein the at least one configurable function corresponds to at least one configurable transceiver function of the mirror.

5. The method according to claim 4, wherein the at least one configurable transceiver function corresponds to at least one of a function of unlocking and locking a door, opening and closing a barrier, and turning on and off a light.

6. The method according to claim 1, further comprising sending the image from the mobile device via a communication circuit of the mobile device to a remote server.

7. The method according to claim 6, further comprising receiving the training information through the communication circuit of the mobile device from the remote server.

8. A non-transitory machine-readable storage medium, having stored thereon a computer program having at least one code section configured to be implemented by a device comprising a display, an image capture device, and at least one processor in communication with the display and the image capture device, wherein the at least one processor is further in communication with a trainable control system for a remote electronic device, the at least one code section executable by the processor to perform the steps comprising:
 activating an identification routine in response to receiving an input; receiving image data from the image capture device, the image data depicting at least one feature of a programmable vehicle accessory;
 comparing the at least one feature to a plurality of corresponding features of a plurality of compatible vehicle accessories;
 identifying the programmable vehicle accessory based on comparing the at least one feature;
 accessing programming information corresponding to at least one trainable operation of the programmable vehicle accessory based on the identification;
 displaying a programming instruction on the display based on the programming information; and
 receiving a signal from the trainable control system in response to an actuation indicating that an input has been received by the trainable control system, wherein the signal confirms a completion of the input instructed by the programming instruction.

9. The non-transitory machine-readable storage medium according to claim 8, wherein the information corresponds to user instructions describing at least one setup operation of the vehicle accessory.

10. The non-transitory machine-readable storage medium according to claim 8, wherein the comparing the at least one feature comprises comparing a plurality of features to a plurality of compatible devices to identify the programmable vehicle accessory.

11. The non-transitory machine-readable storage medium according to claim 8, wherein the at least one code section executable by the processor is further configured to perform the steps comprising:
 identify the at least one feature based on one or more profile shapes corresponding to at least one of a user interface, a bezel, a light sensor, a camera, a directional indication, a time display, an environmental indication, and a mirror angle control button.

12. The non-transitory machine-readable storage medium according to claim 8, wherein the at least one code section executable by the processor is further configured to perform the steps comprising:
 processing the image data via at least one of an edge detection method, a corner detection method, and a blob detection method.

13. The non-transitory machine-readable storage medium according to claim 8, wherein the at least one code section executable by the processor is further configured to perform the steps comprising:
 transmitting the image data to a remote server.

14. The non-transitory machine-readable storage medium according to claim 8, wherein the at least one code section executable by the processor is further configured to perform the steps comprising:
 receiving an identification of the programmable vehicle accessory from the remote server in response to an identification of the programmable vehicle accessory by the remote server from the image data transmitted.

15. A system for identifying a programmable vehicle accessory comprising:
 a display;
 an image capture device;
 a wireless communication interface configured to transmit data between the programmable vehicle accessory and the system, wherein the programmable vehicle accessory comprises a user interface; and
 at least one processor in communication with the display and the image capture device, the at least one processor being operable to:

activate an identification routine in response to receiving an input; receive image data from the image capture device, the image data depicting at least one feature of the programmable vehicle accessory;

compare the at least one feature to a plurality of corresponding features of a plurality of compatible vehicle accessories;

identify the programmable vehicle accessory based on comparing the at least one feature;

access programming information corresponding to at least one trainable operation of the vehicle accessory based on the identification;

communicate a programming instruction of the programming information via the wireless communication interface to the programmable vehicle accessory programming the at least one trainable operation; and receive a signal from the programmable vehicle accessory in response to an actuation indicating an input received by the user interface verifying a completion of the programming instruction.

16. The system according to claim 15, wherein the processor is further operable to:

identify the at least one feature based on one or more profile shapes corresponding to at least one of a user input, a bezel, a light sensor, a camera, a directional indication, a time display, an environmental indication, and a mirror angle control button.

17. The system according to claim 15, wherein the processor is further operable to:

process the image data via at least one of an edge detection method, a corner detection method, and a blob detection method.

18. The system according to claim 15, wherein the programmable vehicle accessory comprises a transmitter configured to emit a control signal configured to control an electronic device via the transmitter.

* * * * *